United States Patent [19]
Cahill, III

[11] Patent Number: 5,987,527
[45] Date of Patent: *Nov. 16, 1999

[54] BINDING DATA SINKS AND SOURCES ACROSS RING LEVELS

[75] Inventor: Benjamin M. Cahill, III, Ringoes, N.J.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/576,180

[22] Filed: Dec. 21, 1995

[51] Int. Cl.$^6$ ........................................................ G06F 9/46
[52] U.S. Cl. ............................................ 709/301; 709/305
[58] Field of Search ...................... 395/682, 681, 395/680, 412, 670, 685; 709/301, 300, 305

[56] References Cited

U.S. PATENT DOCUMENTS

| | | | |
|---|---|---|---|
| 4,177,410 | 12/1979 | Appel et al. . | |
| 5,255,379 | 10/1993 | Melo | 395/400 |
| 5,283,900 | 2/1994 | Frankel et al. | 395/700 |
| 5,303,378 | 4/1994 | Cohen et al. . | |
| 5,332,299 | 7/1994 | Koval et al. | 395/550 |
| 5,339,413 | 8/1994 | Koval et al. | 395/650 |
| 5,434,913 | 7/1995 | Tung et al. | 379/202 |
| 5,487,167 | 1/1996 | Dinallo et al. | 395/650 |
| 5,493,568 | 2/1996 | Sampat et al. . | |
| 5,530,858 | 6/1996 | Stanley et al. | 395/650 |
| 5,572,695 | 11/1996 | Andrews et al. | 395/412 |
| 5,596,755 | 1/1997 | Pletcher et al. . | |

OTHER PUBLICATIONS

B. Thompson, M. Grosen, S. Wilson, "DSP Resource Manager Interface and its Role in DSP Multimedia", Electro/94 Int'l. Conf. Proc. pp. 292–298, May 12, 1994.
SPOX Technical Notes, #38: Dynamic Loading in IA–SPOX, Jun. 1997.
Greenberg, Ross; "Design concepts & considerations in building an OS–2 dynamic link library," Microsoft Systems, v3, n3, p27(22) May 1988.
Zytanuk, Kelly; "Windows 3.1 Virtual Machine Control Block Part 2," Dr. Dobb's; v19, n2 p107(7); Feb. 1994.
Hazzah, Karen, Fast interrupt handling without VxDs; Windows–DOS Developer v4, n6, p38(17).
Schmidt, Alex; "Ringo: VxDs on the fly," Dr. Dobb's, v19, n3, p133(7), Mar. 1994.
Tanenbaum, Modern Operating Systems, 1992, Prentice Hall pp. 135–140.

*Primary Examiner*—Lucien U. Toplu
*Attorney, Agent, or Firm*—William H. Murray; N. Stephan Kinsella

[57] ABSTRACT

Binding data sinks and sources across ring levels of a computer. A new binding channel is created and attached to a comm channel. A unique name is created for the binding channel, and a handle to the unique name is obtained at a relatively low priority ring level. The handle is passed to an unbound relatively high priority ring level code module.

20 Claims, 6 Drawing Sheets

BINDING DATA SINKS AND SOURCES ACROSS RING LEVELS

BACKGROUND OF THE INVENTION

1. Field of the Invention

The present invention relates to different ring levels of computer systems, and, in particular, to methods for binding a data sink at one ring level to a data source at another ring level.

2. Description of the Related Art

Computer systems typically run a variety of applications and programs, from user-applications to server-type programs which provide services for applications, to operating systems which support all other applications and programs running thereon. Data streams are often established between various elements of a computer system to allow for the communication or transmission of data. These elements may be hardware, such as a speaker or "SoundBlaster" card or peripheral, or they may be software entities such as applications, dynamically-linked libraries ("DLLs"), servers, operating systems, objects, and the like. In addition, communication ("comm") channels are often used for interconnecting different PCs.

Many central processing units ("CPUs"), or processors, of computers and their respective operating systems operate at various so-called computing or processing "ring levels." A Ring level may be understood to be a priority level at which the processor operates when running certain code or programs or when controlling or servicing certain hardware devices. Often there is communications between modules within the computer at different Ring levels, or across Ring levels. As is understood, Ring levels are utilized to avoid conflicts in the operating system and for other purposes. For instance, Ring 0 is considered to be the highest priority Ring level, while Ring 3 is a lower priority Ring level. Thus, an operating system running at Ring 0 has higher priority than an application running at Ring 3. Within a given Ring level there may also be different priorities, such as a relatively high priority interrupt. However, a Ring 3 interrupt is typically of lower priority than a non-interrupt Ring 0 function.

SUMMARY

There is provided herein a method, data conferencing system, and storage medium for binding data sinks and sources across ring levels of a computer. In one embodiment, a new binding channel is created and attached to a comm channel. A unique name is created for the binding channel, and a handle to the unique name is obtained at a relatively low priority ring level. The handle is passed to an unbound relatively high priority ring level code module.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

System Hardware

Figure 1:
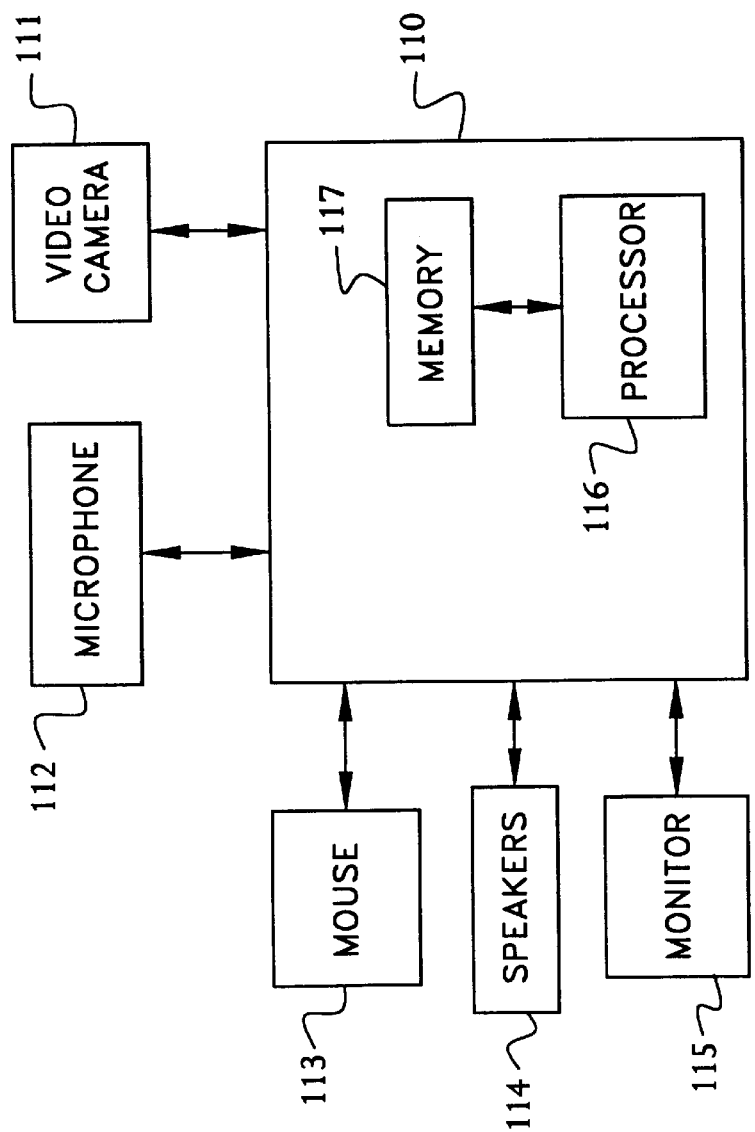
FIG. 1 shows a computer system having ring levels in accordance with the present invention.

Referring now to FIG. 1, there is shown computer system 100 having ring levels in accordance with the present invention. Computer system 100 may be a personal computer ("PC") having a processor 116, memory 117, video camera 111, microphone 112, mouse 113, speakers 114, and monitor 115. The computer may be interconnected in a network with other computers or nodes of the network via a medium or communication channel such as an Integrated Services Digital Network ("ISDN") (not shown). PCs and other nodes may be interconnected through a variety of communication media, including local area networks ("LANs"), plain-old telephone lines ("POTS", sometimes referred to as public switched telephone networks ("PSTN")), and the like. In a multi-point conferencing system, a plurality of multi-point conferencing units ("MCUs") may also be utilized, as will be understood by those skilled in the art, to transmit data to and from various nodes or "endpoints" of the conferencing system. Nodes and/or MCUs may be interconnected via an ISDN link or through a local area network ("LAN"), in addition to various other communications media.

Processor 116, in one embodiment, is a general-purpose programmable processor, such as an Intel® Pentium™ processor. Those skilled in the art will also appreciate that other types of processors may be utilized, for example a special-purpose video processor such as the Intel® 82750PB.

Comm Channels Across Ring Levels

One specialized type of operating system ("OS") that is often utilized as an OS for digital signal processing ("DSP") systems is the IA-SPOX environment, provided by Spectron Microsystems. As is appreciated by those skilled in the art, IA-SPOX runs under Microsoft® Windows™ at Ring 0, and provides support for handling of data streams. One typical usage that requires support in computer systems is the capture and transmission of video or other forms of data. For instance, video data may be captured from a Ring 0 data source such as a video camera connected to digitizing hardware, and its associated video driver, and transmitted to a remote user via a comm channel such as a LAN or modem (the Ring 3 data sink). As another example, a microphone and its associated hardware card and driver (data source) may serve as a Ring 0 data source for the system to a Ring 3 comm transport (data sink) to be transmitted via a LAN to a remote user. Alternatively, the data source may be at Ring 3, such as the reception of audio data via a Ring 3 comm channel from a remote user, and communicated to a local hardware speaker device and associated driver (Ring 0 data sink).

As will be understood, in general lower level programs commonly referred to as drivers provide services for applications; whereas applications typically have a user interface for interfacing with a human user of the application.

The present invention provides a means for binding Ring 0 data streams to Ring 3 comm transports, or, more generally, for binding data sinks and sources across ring levels. The present invention may be used for connecting data streams between computing Rings within any type of environment having such computing Ring levels, such as the Microsoft® Windows™ environment. More specifically, it utilizes certain resources in a specialized data stream OS such as the IA-SPOX operating environment to provide a mapping of a specific SPOX data stream to a specific comm channel.

As will be described in further detail hereinbelow, the present method of binding a Ring 0 data stream to a Ring 3 comm transport comprises the following elements. First, there is provided a means for creating a new binding channel, and for attaching it to a given comm channel. A unique name is created for the binding channel. The handle to that name is obtained at the Ring 3 level, and the handle is passed to an unbound Ring 0 code module. There is also provided a means for using the handle to create a new stream that binds to the specific binding channel, thereby binding the stream to the specified comm channel. As will be appreciated, a handle is a pointer for referring to the memory location for the item to which the handle attaches or is pointed. Further, it will be understood that binding refers to the opening of a data connection or channel between a data source and a data sink, such as two modules or elements of a computer system.

Thus, as will be appreciated by those skilled in the art, the current method supports a generalized interface for Ring 0 data capture and playback code. The interface allows the capture/playback tasks, in the IA-SPOX environment, to pass data to a Ring 3 destination, while appearing as a Ring 0 destination. It allows Ring 3 code to specify the binding connections between the Ring 0 data stream and the Ring 3 comm channels, and requires no knowledge of Ring 3 interfaces by the capture/playback code modules. In general, the present invention may be utilized to bind data streams in the IA-SPOX environment or similar environment having a variety of data sources and sinks.

Ring Transitions for Data Chunks

There is provided herein a method for providing Ring transitions for data buffers. As will be understood, data buffers are discrete chunks of data into which a larger set of data is typically broken up for transmission and communication. As used in this specification, therefore, the expression "buffer" or "data buffer" refers to such a chunk of data, rather than to a physical memory device which is also sometimes, in other contexts, referred to as a buffer. Thus, a given data file may be broken into a plurality of data buffers (or chunks), for example of 1Kbytes each, before transmitting each data buffer from a source to a destination. Data may also vary in size as well. In the present system each data buffer is "owned" by only one module within a computer system at a time. As will be appreciated, ownership of data buffers is mutually exclusive and defines which module or element within a computer system is responsible for doing something with the data. Under such an ownership system, although a module not having ownership of a particular data buffer may be physically capable of accessing the data buffer, in general it will not do so since it knows that it does not have ownership of the data buffer. In such an ownership system, data buffers may be passed from module to module, by passing the ownership of the data buffer, much as runners in a relay race hand a baton from one runner to the next.

When data buffers are passed in this manner, often a Ring transition must be made, for example a Ring 0 module may pass the data buffer to a Ring 3 module. There is provided herein a means for providing such Ring transitions. This method is used for efficiently exchanging buffers of varying sizes between computing Rings within an environment having such computing rings, such as the Microsoft® Windows™ environment as described above. The description provided herein assumes transitions from Ring 0 to Ring 3 and vice-versa, although the present Ring transition method is applicable, in general, to transitions across any two different computing Rings.

As will be described in further detail hereinbelow, the present method accepts buffers from Ring 0 sources, translates their addresses to another Ring (e.g., Ring 3), and then advises the relevant code in Ring 3 of their availability. On the return trip, it accepts buffers from Ring 3, translates their addresses back to Ring 0, and advises code in Ring 0 of their availability. This Ring transition method comprises first detecting whether a given Ring 0 buffer is "new" to the redirector means (described in further detail below). Whether a buffer is "new" depends on whether it has previously been encountered. If the Ring 0 buffer is indeed new, a new local descriptor table ("LDT") entry is allocated, and the existence of such LDT entry is locally recorded in the order allocated. The Ring 0 and Ring 3 addresses associated with each entry are different, as will be appreciated, as different computing Rings typically comprise different address spaces. Thus, the Ring 0 and Ring 3 addresses associated with each LDT entry are locally recorded.

If the given Ring 0 buffer is "old," however, the associated Ring 3 address is extracted from the record. The availability of a new buffer is transmitted to Ring 3. and there is provided a means for Ring 3 code to return the buffer to Ring 0 when the processing of the data buffer is complete. The record of LDT entries is searched in order to match the returned buffer with an LDT. Further, the Ring 0 address is extracted from the record. The availability of a returned buffer is transmitted to other Ring 0 code.

Thus, this Ring transition method allows efficient transfer of variable sized buffers between processing Rings. No buffer copies are required. Packet identities are kept distinct, even though the contents of those packets (number of bytes) may vary. LDT allocation is kept to a minimum by the use of the LDT record. As will be understood, efficiency is tuned or adjusted for the case of consistent buffer order, which is common in certain environments, such as the IA-SPOX environment. Therefore, the present invention provides a method for data exchange of variable-sized buffers across inter-Ring interfaces such as the WinSPOX interface.

External Specifications

The following description describes the above-described methods in further detail. AV operations such as audio capture and playback tasks and video capture and playback tasks run under IA-SPOX in Ring 0. For greatest efficiency, as more new communications capability migrates to the IA-SPOX environment, the capture/playback tasks must send/receive data directly to these Ring 0 communications modules without passing data into Ring 3. An interface is utilized that provides a generalized bridge for establishing and maintaining this connection in Ring 0.

However, for backwards compatibility with current transport stacks which are supported via interfaces such as the Intel® Transport Independent Interface ("TII"), the Intel®

Protocol Independent Interface ("PII"), or any other Ring 3-based interface, data must be redirected from Ring 0 up to Ring 3 in an efficient manner. A module referred to as the "Redirector" is utilized herein for exchanging buffers of data between Ring 0 and Ring 3 without performing copies, thereby enhancing efficiency. The Redirector may be interfaced with interfaces such as TII or PII at Ring 3.

Figure 2:
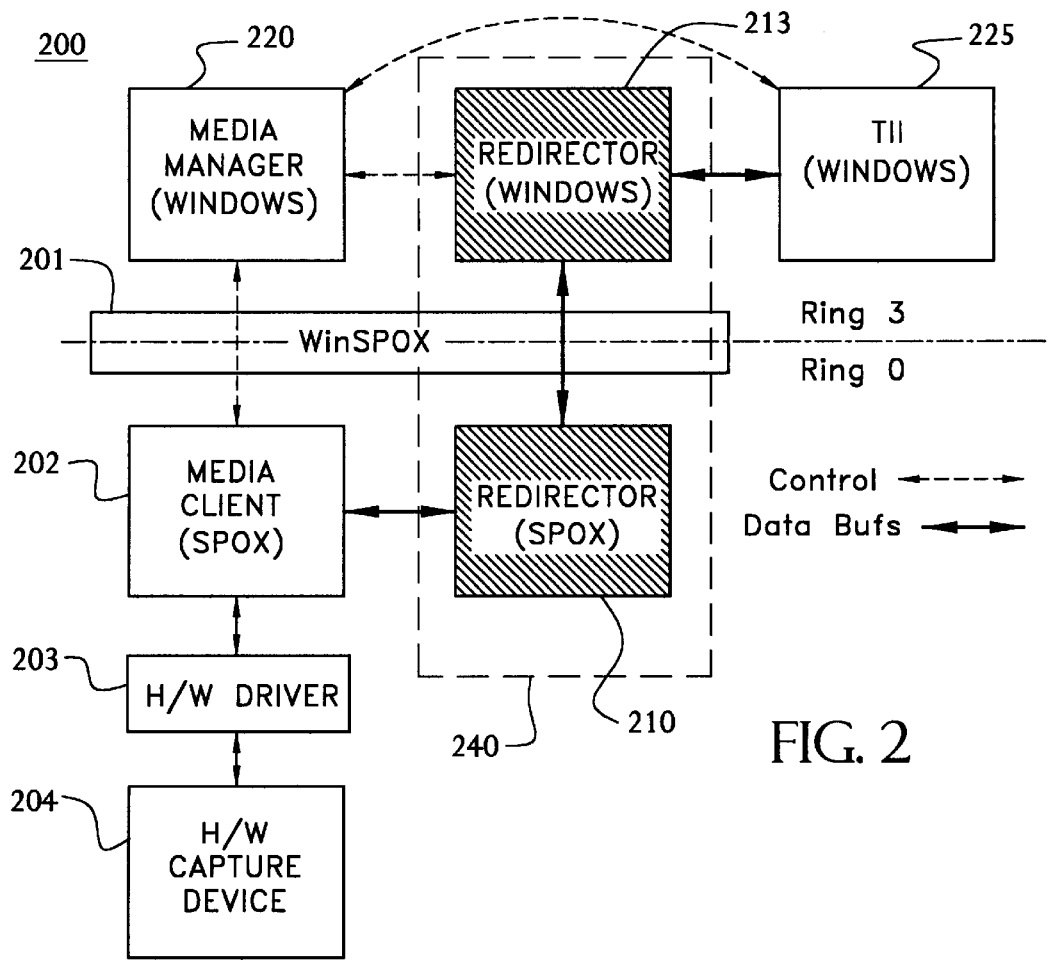
FIG. 2 is a block diagram showing the modules of a computer system with data flow and control in accordance with the present invention.

Referring now to FIG. 2, there is illustrated a block diagram showing the modules of a computer system 200 with data flow and control in accordance with the present invention. As will be understood, the WinSPOX box represents an application programmer's interface ("API") that interfaces between Ring 3 based entities or modules such as those in the Windows operating system with Ring 0 based entities or modules such as those operating in the IA-SPOX environment. At Ring 0 (i.e, SPOX, in the present example) lie the Media Client 202 and Ring 0 Redirector module 210. At the Ring 3 level are the Media Manager 220, Ring 3 Redirector module 213, and TII module 225. As will be understood, a media client is a type of server that interfaces with various media input or output devices. In general media clients such as media client 202 interface with either a data source or data sink at Ring 0. Thus media client 202 is designed to grab data from a source at Ring 0 such as the audio or video stream from a microphone or camera (e.g., such as a hardware capture device 204 via a hardware driver 203) and send the data to a comm transport. Media client 202 is also designed to take data such as video data and deliver it to a Ring 0 data sink such as a monitor. A media manager such as media manager 220 acts as a go-between between an application such as a video conferencing application running at ring 3 and the a media client 202, as will be understood and as will be apparent from the description provided hereinbelow. TII 225 serves as the interface to any comm transport (e.g., ISDN or modem link) that serves as a pipeline to, for example, remote users. The unified or overall Redirector 240 is divided into two components or modules, Ring 3 redirector 213 at Ring 3 and Ring 0 redirector 210 at Ring 0. As will be appreciated, each redirector 210, 213 comprises a DLL. Ring 3 redirector 213 supports the setup and teardown of Redirector channels, via calls from Media Manager 220, and also supports the transfer of buffers between TII and Ring 0 redirector module 210 via calls to TII and callbacks from TII, as well as calls to WinSPOX and callbacks from WinSPOX, as will be understood by those skilled in the art. Ring 0 redirector 210 serves as a terminating device for an IA-SPOX stream opened by Media Client 202, and also exchanges buffers between itself and Ring 3 Redirector 213 via WinSPOX messages.

Using the Redirector

The following sections describe the setup and teardown of a connection through Redirector 240. Certain steps must be performed in a certain order. Others may be performed independently.

Opening a Redirector Channel

A Redirector channel is a unidirectional (i.e. capture- or playback-only) path for supporting data flow between Ring 0 and Ring 3 (or, in general, between any two different computing Ring levels, as will be appreciated). A Redirector channel may be linked and re-linked to multiple connections (such as TII channels) and multiple media streams over its lifetime, but can support only one TII channel and one media stream at any one time. Redirector channels may be opened on an as-needed basis at any time during the course of an application, with a limit of open channels at any given time depending upon current technology and other cost factors (for example, a limit of 10 open channels at any given time).

In one embodiment, three such channels are used: audio capture, audio playback, and video capture. These Redirector channels may be established at the beginning of an application, and may exist and be waiting for a connection throughout the life of the application. As will be appreciated, this saves setup and teardown execution time. These channels may be used and re-used as communications connections are established and torn down multiple times over the life of the application. They may also be created and deleted on an as-needed basis, which costs setup and teardown execution time, but also saves memory when the Redirector is not needed.

Figure 3:
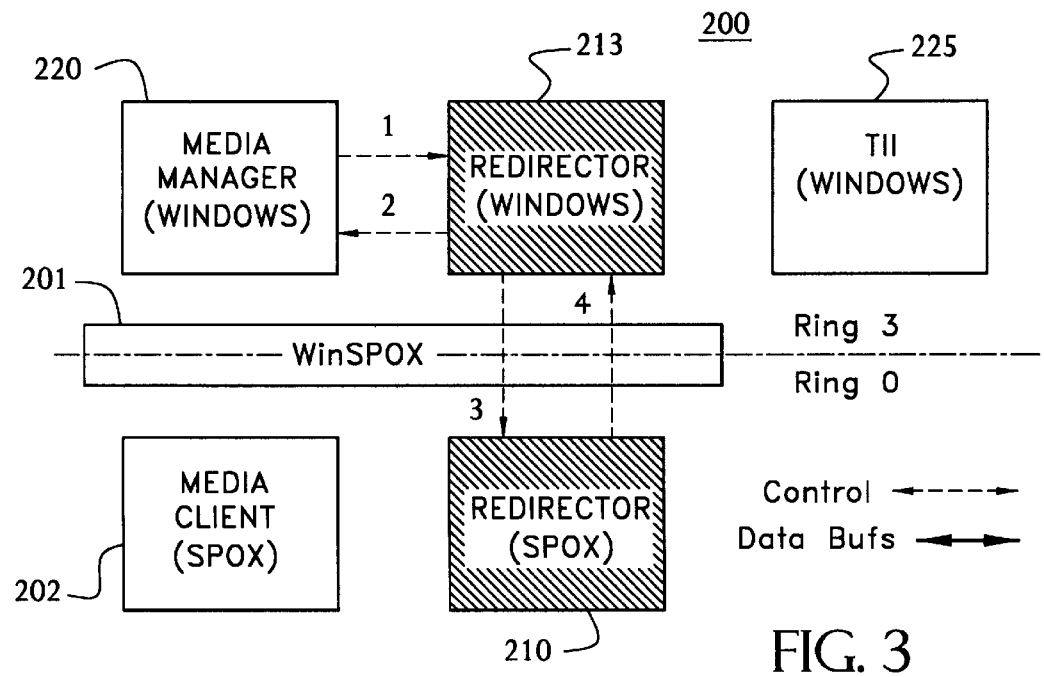
FIG. 3 illustrated the opening of a Redirector channel in the computer system of FIG. 2.

Referring now to FIG. 3, there is illustrated the opening of a Redirector channel in computer system 200 of FIG. 2. To open a channel, Media Manager 220 makes a call to the RED_CreateChnl( ) function (described hereinbelow), as illustrated by step 1 (the arrow labeled "1") in FIG. 3. Media Manager 220 supplies the following when making the call:

Pointers to three TII calls: tiiSendData, tiiRecvData, and tiiRegChnlHandler. Only two calls are needed for any given channel, since each channel can be either capture or playback only.

Playback/Capture direction of data flow (Playback is from Ring 3 TII 225 to the Ring 0 Media Client 202)

Loopback/Normal mode of operation (loopback bounces buffers from a Ring 0 Media Client stream back to another Ring 0 Media Client stream. Buffers come up through Ring 3, but are not sent to TII 225).

Loopback channel for complementary operation (discussed below).

Pointer to "magic cookie" for later access to this channel.

As will be appreciated, a "magic cookie" refers to a channel identifier. The RED_CreateChnl function fills in the "magic cookie," stores the pointers to the TII functions (no connection is made to TII at this time, however), performs other internal initialization, and returns an error code to the caller (step 2 in FIG. 3). It also calls WinSPOX (step 3) to create a new instance of the Ring 0 Redirector task. Note that WinSPOX may have a limit on the total number of tasks/instances it can support in the entire PC system.

Once the Ring 0 Redirector 210 has completed its Create phase and has started its Execute phase, it sends a message up to the Ring 3 Redirector 213 to pass along a Ring 0 character stream (step 4). This unique character stream is the name of the new Redirector instance, and must be used later by the Media Client 202 in order to connect to the Redirector via a SPOX data stream.

As long as the Ring 3 Redirector DLL 213 is "alive," it assigns each new instance of the Ring 0 Redirector task a unique number, which the Ring 0 task incorporates into a self-generated instance name. In an embodiment, this name takes the form "/redirector:XXXXXXXXXXXXXXXX", in which the "X"'s constitute an ASCII representation of the assigned number. The first task is assigned the number 0, and each new task is assigned an incrementing number. Even as Redirector channels are destroyed and created over the lifetime of the Ring 3 Redirector 213, the number continues to increment, causing each instance of the Ring 0 task to have a unique name.

This Ring 0 Instance Name (which is a 32-bit pointer, or "handle") is stored by the Ring 3 Redirector 213 for the lifetime of the Redirector Channel. It will be returned to the Media Manager 220 whenever the Media Manager makes a successful RED_LinkIn or RED_LinkOut call to the Redirector channel (this may be done multiple times over the lifetime of the Redirector channel). It should be noted that the setup of the Ring 0 Redirector 210, and the Instance Name message from the Ring 0 Redirector 213 to the Ring 3 Redirector 213 are asynchronous to the original RED_CreateChnl call. A successful return from the RED_CreateChnl call does not guarantee that the Ring 0 Redirector was successfully launched, however, as will be understood. Whether there was a successful launch or not may be confirmed via the RED_LinkIn or RED_LinkOut call.

The RED_CreateChnl call may fail for one of the following reasons:

All possible Redirector channels (currently maximum of 10) are being used;

Failure to open a Ring 0 Redirector task instance; or

Failure to successfully set up a loopback channel, if called for.

Loopback support is discussed in further detail below.

Linking with the TII Channel

Figure 4:
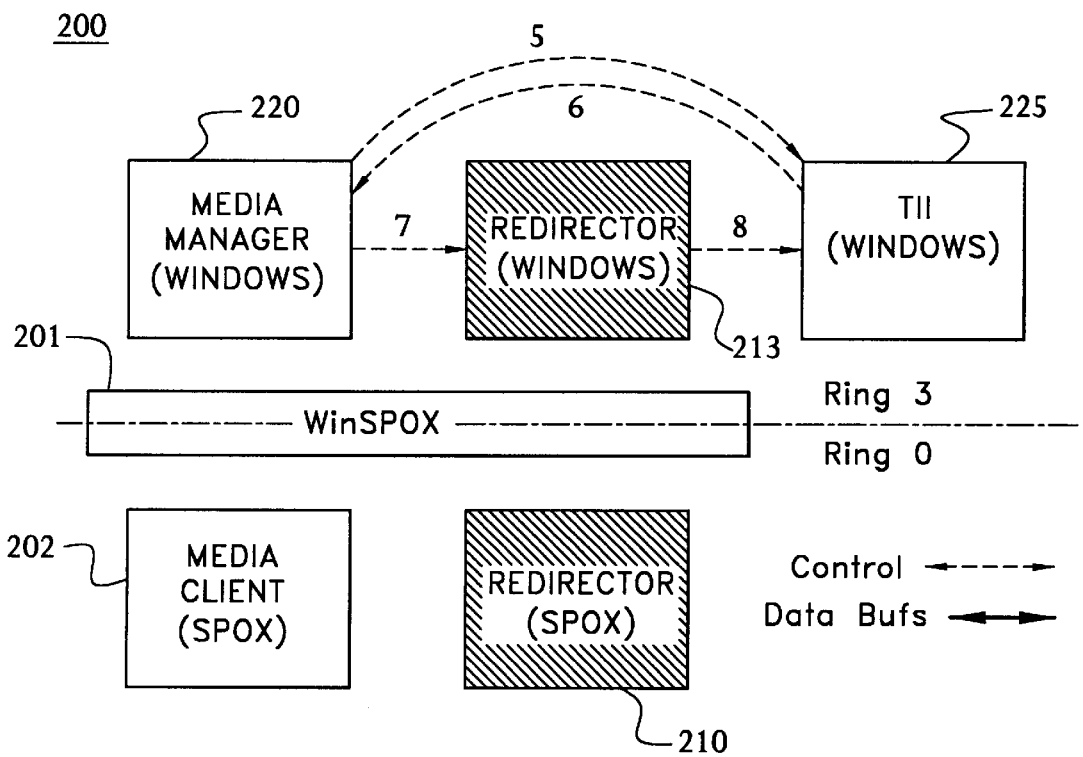
FIG. 4 illustrates the steps of linking with a comm transport channel in the computer system of FIG. 2.

Referring now to FIG. 4, there are illustrated the steps of linking with a comm transport channel in computer system 200 of FIG. 2. The next step is to create a connection via TII. This is done in the usual fashion by the Media Manager 220 or some other area of the application (step 5). TII 225 returns a channel handle (step 6), which is used in a RED_LinkIn call (for playback) or RED_Linkout call (for capture) (step 7). Along with the TII channel handle, the Media Manager 220 must also include the "magic cookie" for the Redirector channel to be used for this connection.

In executing the RED_LinkIn/Out call, the Ring 3 Redirector 213 registers an internal callback function as the TII Channel Data Handler function (step 8). The TII connection establishment (step 5) may be done prior to or after a Redirector channel is created, but must, of course, be done prior to making the RED_LinkIn/Out call. The RED_LinkIn/Out call may fail and return NULL for one of the following reasons:

Invalid "magic cookie";

Channel associated with "magic cookie" is not active (for example, destroyed since "magic cookie" was obtained);

LinkIn called for a capture channel;

LinkOut called for a playback channel;

The associated Ring 0 task is not open;

The Instance Name for the associated Ring 0 Redirector is not valid; or

Failure in registration of Redirector data handler callback function with TII (only if channel is NOT in loopback mode).

Linking with the Media Client

Figure 5:
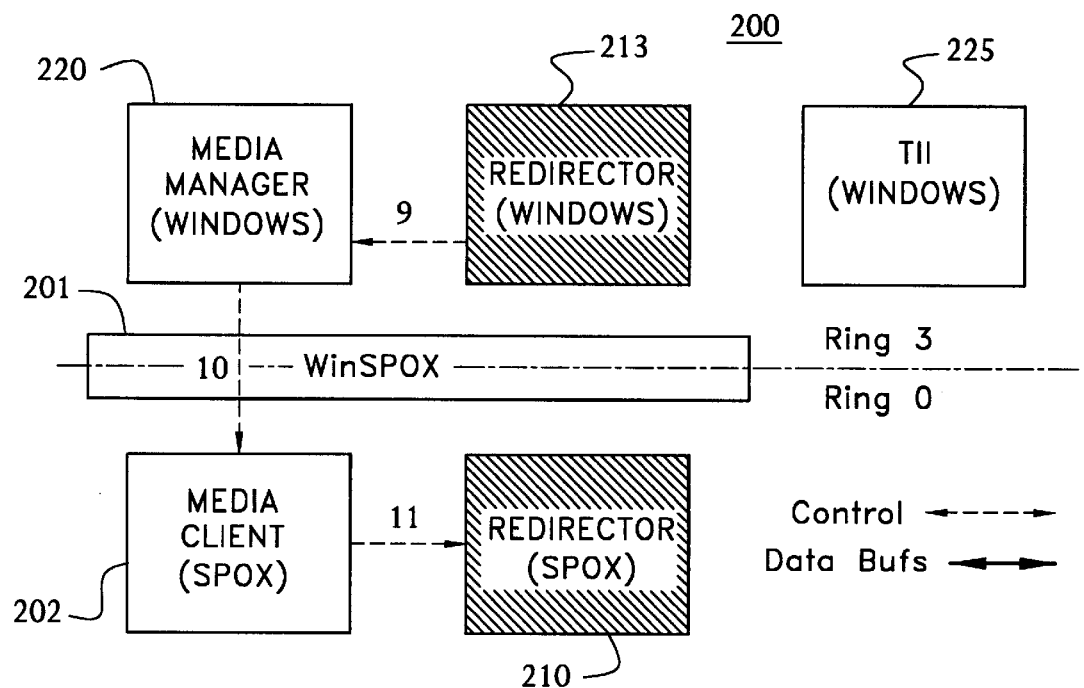
FIG. 5 illustrates the steps of linking with the media client in the computer system of FIG. 2.

Referring now to FIG. 5, there are illustrated the steps of linking with the media client in computer system 200 of FIG. 2. When the RED_LinkIn/Out call completes, it returns the Ring 0 Stream Name (32-bit pointer) (step 9) to the Media Manager. If this value is not NULL (indicating failure), the Media Manager 220 must pass the Stream Name (step 10) to the Ring 0 Media Client 202, and ask it to open a stream using the Stream Name in an SIO_create( ) SPOX call (step 11). In one embodiment, each Redirector channel supports only one stream.

A successful return from the SIO_create( ) indicates that the Redirector is now set up and ready to transfer data buffers. The SIO_create( ) may fail for one of the following reasons:

Failure to find match for Redirector Instance Name (including number);

Failure to allocate internal memory resources;

Failure to communicate internally between Stream and Redirector task;

Failure to communicate internally between Redirector task and Ring 3 Redirector;

Conflict between SIO mode (INPUT/OUTPUT) and mode (PLAYBACK/CAPTURE) indicated in RED_createChnl( ) call;

Redirector channel already in use by another stream; or

Any generic reason for which SIO_create( ) would fail. If desired, it is possible to SIO_delete the stream, and then later re-open it using SIO_create and the same Stream Name. Care should be taken, however, to make sure that the TII channel has been properly set up with the RED_LinkIn/Out call, and has not been torn down in the meantime. It should be noted that, in some embodiments, the Redirector may not be able to sense whether it is still connected to a valid TII channel.

Issuing Data Buffers

Figure 6:
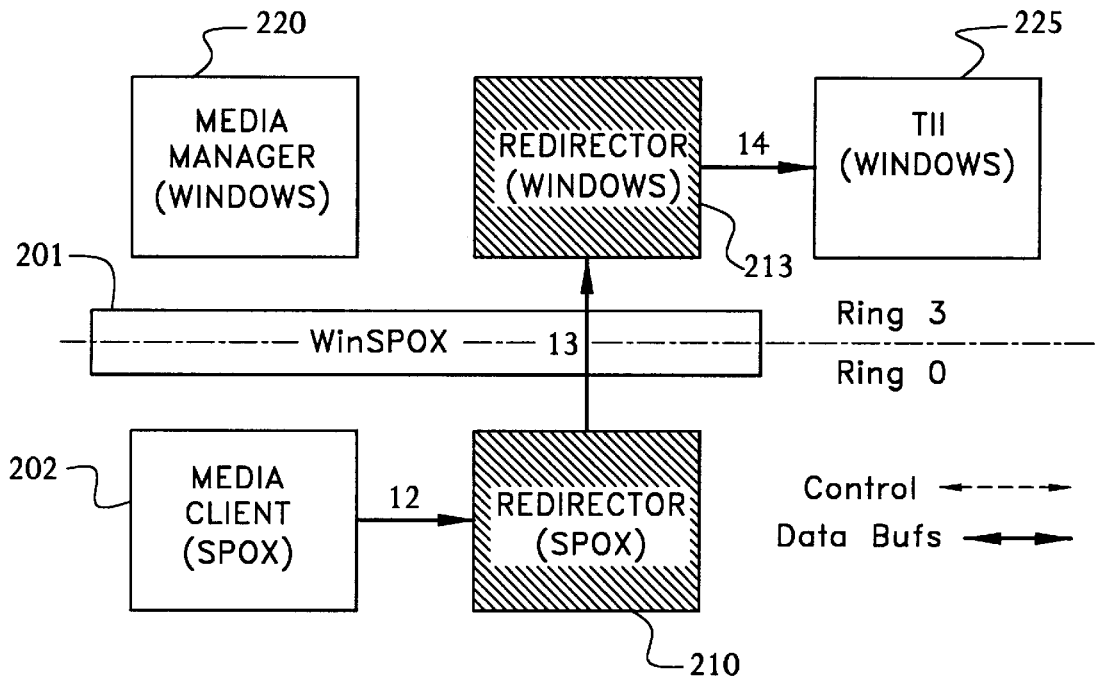
FIG. 6 illustrates the steps of issuing data buffers in the computer system of FIG. 2.

Referring now to FIG. 6, there are illustrated the steps of issuing data buffers in computer system 200 of FIG. 2. Once the stream is created, data buffers may be transferred by the Media Client task using a standard IA-SPOX SIO_issue( ) call (step 12). In the case of a capture channel, full buffers will be issued to the Redirector for TII 225 transmission. In the case of a playback channel, empty buffers will be issued by the Redirector to be filled by data received by TII. The following describes how the buffer is handled inside the Redirector as a result of the SIO_issue( ).

The base of the Ring 0 Buffer is translated into a Ring 3 address by the Ring 0 Redirector 210, so that it is immediately usable by TII 225. This is accomplished internally by maintaining a list of internally-allocated Local Descriptor Table ("LDT") entries for the System Virtual Machine ("Sys VM"). If the Redirector receives a buffer which it has not "seen" before, it allocates a new LDT entry and puts it in the internal list. If the Redirector receives a buffer that it has processed earlier, it matches the buffer to one of the LDTs on the list.

The buffer is then relayed by the Ring 0 Redirector 210 up to the Ring 3 Redirector 213 via a WinSPOX message (step 13), which includes the buffer size as well as the Ring 3 address. At this point, the SIO_issue( ) returns to the Media Client 202, and the following operations occur asynchronously.

The Ring 3 Redirector 213 then relays the buffer to TII 225, using either the tiiSendDataP or the tiiRecvDataP function pointer (step 14) delivered in the original RED_CreateChnl( ) call. The Ring 3 Redirector 213 retains a record of each buffer sent to TII 225. This record is used both when TII 225 calls back the Redirector to return the buffer (discussed in the section herein entitled "Reclaiming Data Buffers"), as well as when buffers are flushed from the stream by the Media Client 202 (discussed further in the section herein entitled "Stream Teardown").

If the TII Send or Receive function call fails, the Ring 3 Redirector 213 retains the buffer for later return to Ring 0. This may be caused by lack of buffer retention space within TII 225, or by the TII connection no longer being active. When retaining buffers, buffer order is maintained by the Ring 3 Redirector 213 in order to satisfy the conventions of the SIO_issue/reclaim protocol. The SIO_issue( ) may fail for one of the following reasons:

Failure to match buffer with old LDT or allocate new LDT;

Failure to communicate internally between Stream and Redirector task;

Failure to communicate internally between Redirector task and Ring 3 Redirector; or Any generic reason for which SIO_issue( ) would fail. The SIO_issue( ) will not fail due to any reason occurring in Ring 3 (e.g. failure to transmit to TII), since all Ring 3 activities are asynchronous with the SIO_issue( ).

Reclaiming Data Buffers

Figure 7:
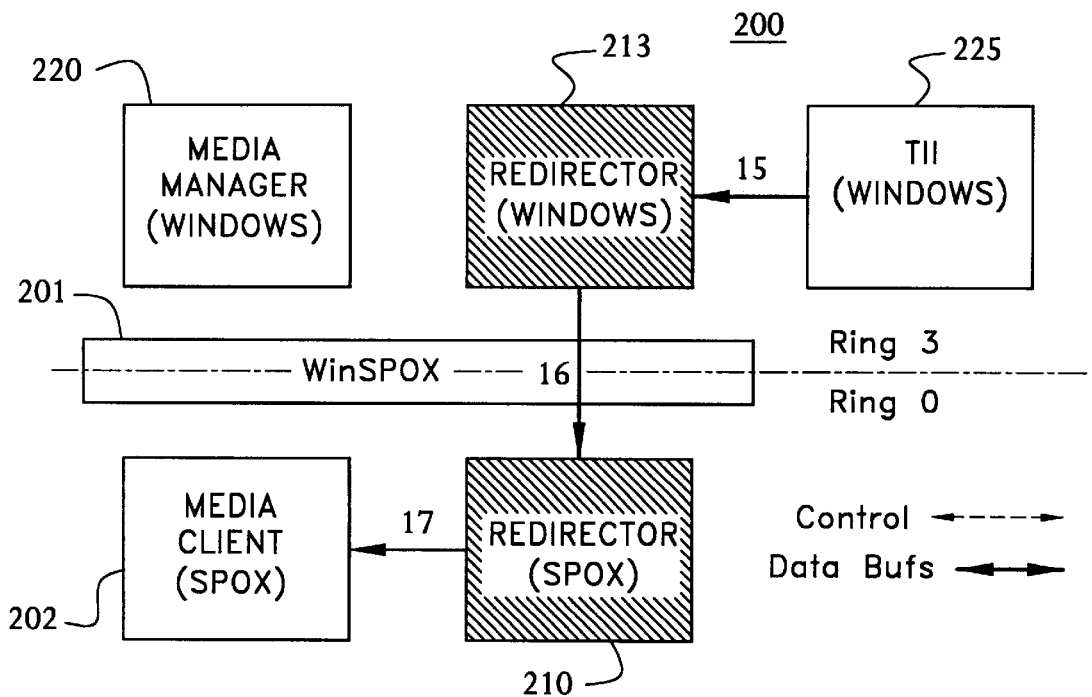
FIG. 7 illustrates the steps of reclaiming data buffers in the computer system of FIG. 2.

Referring now to FIG. 7, there are illustrated the steps of reclaiming data buffers in computer system 200 of FIG. 2. When TII 225 has a buffer available for reclaiming, it calls a callback function (step 15) in the Ring 3 Redirector 213. The callback function validates the buffer, and then sends it down to the Ring 0 Redirector 210 via a WinSPOX message (step 16). If TII 225 does not return a valid buffer, one of the following conditions may be possible:

CHAN_LOST_DATA with a valid transaction ID. In this case, the Ring 3 Redirector 213 sends the buffer down to Ring 0, marked with a status bit indicating lost data. The Ring 3 address and data count delivered by TII 225 are also forwarded in the WinSPOX message.

CHAN_LOST_DATA with a NULL transaction ID. In this case, the Ring 3 Redirector 213 sends a message to Ring 0, marked with a status bit indicating lost data. A NULL address and a 0 data count are also forwarded in the WinSPOX message.

For each callback from TII 225, the Ring 3 Redirector 213 also scans internally for any retained buffers which might have been skipped because of a non-successful TII Send or Receive Data call. If it finds any skipped buffers, it sends them to Ring 0 via a WinSPOX message (step 16), before the current buffer is sent. This maintains buffer order to support the SIO_issue/reclaim conventions. The Ring 0 Redirector 210 translates the Ring 3 addresses back into Ring 0 addresses, by searching a queue of LDTs that it generated when the buffer was issued from the Media Client 202. It should be noted that all buffers must originate from the Media Client 202 in Ring 0, as the Redirector will fail to translate into Ring 0 any buffer that originated in Ring 3.

After translation, the Redirector makes the buffer available to the Media Client 202, which can then call SIO_reclaim( ) (step 17). Using SIO_reclaim( ), the Media Client 202 may also examine the contents of an argument value which accompanies the buffer. The Redirector uses this argument to forward error flags to the Media Client 202. Error conditions include:

Failure to translate Ring 3 address to Ring 0 (buffer pointer will be NULL);

Lost Data;

Improper TII operation; or

Flushed buffer (although this is not really an error, as discussed with respect to stream teardown hereinbelow). The errors above do not constitute a failure in the SIO_reclaim( ), but indicate that data in the returned buffer (if any) is invalid. The SIO_reclaim( ) itself may fail for one of the following reasons:

Failure to communicate internally between Stream and Redirector task;

Failure to communicate internally between Redirector task and Ring 3 Redirector 213; or Any generic reason for which SIO_issue( ) would fail. Back pressure may be sensed by the Media Client 202 via a prolonged period of non-availability of buffers for reclaim. SIO_select( ) is a useful call for determining if buffers are available for reclaim by the Media Client 202, especially when used with a finite timeout value for back-pressure sensing. As will be appreciated, back pressure may be generated by a TII connection being destroyed while the stream is still active (with TII, this is the standard method of teardown, as discussed below), or by excessive delays in the transport medium, or by non-transmission of data from the local or the peer communications Service Provider.

Closing TII Channel and Reclaiming Outstanding Buffers

Figure 8:
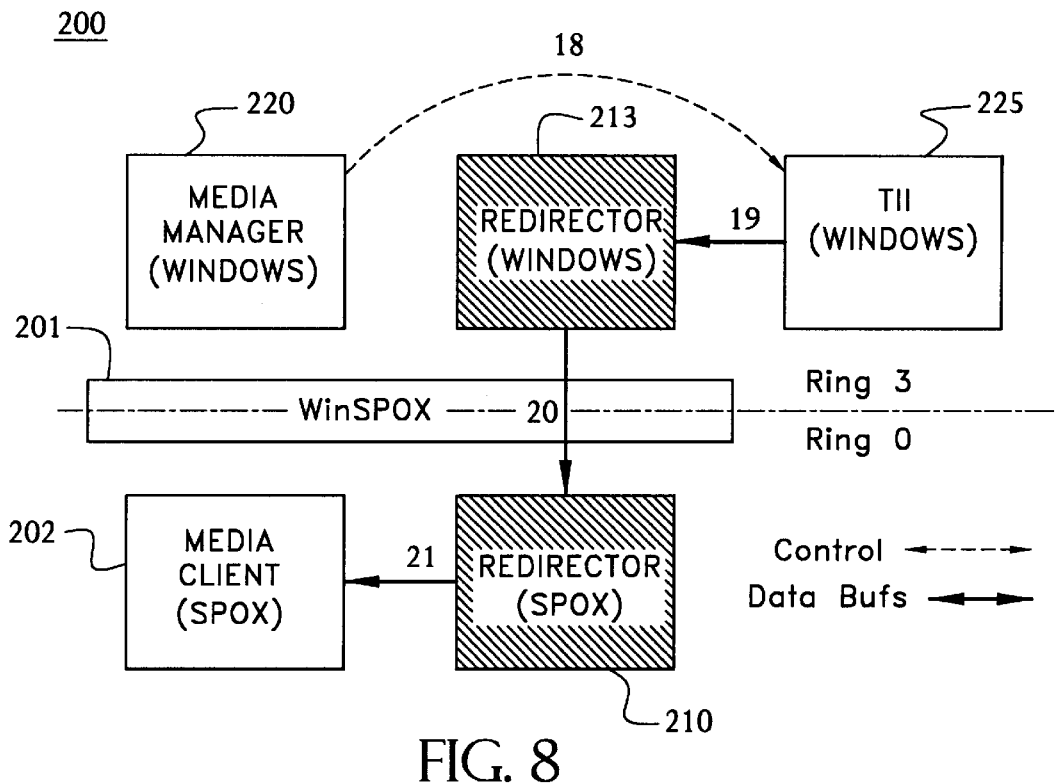
FIG. 8 illustrates the steps of closing a channel and reclaiming outstanding buffers in the computer system of FIG. 2.

Referring now to FIG. 8, there are illustrated the steps of closing a channel and reclaiming outstanding buffers in computer system 200 of FIG. 2. Once all desired communications activity is complete, the TII channel must be closed before closing the Media Client's Redirector stream. This ensures that the Media Client 202 can reclaim all of its outstanding buffers, and free them if desired, before closing the stream (see below). It also ensures that TII 225 does not access any buffers which have been flushed from Ring 3 back down to Ring 0 (discussed below).

The TII channel is closed in the normal fashion (step 18). There is no need to alert the Redirector 240 that this action has been taken. Any TII Send or Receive Data calls executed by the Ring 3 Redirector 213 will return with an error, and the Redirector will retain the buffers for return to Ring 0 at a later time. When the TII channel is closing, TII 225 may use the Redirector callback to return any buffers that TII 225 still possesses (step 19). In this case, the buffers will be returned to Ring 0 in the normal fashion. TII may also not return the buffers, in which case the Ring 3 Redirector 213 simply retains a record of any buffers which "disappeared" when the TII channel closed.

The Media Client 202 must call SIO_flush( )(not shown) in order to stimulate the Ring 3 Redirector 213 to return any retained buffers to Ring 0. All buffers will be returned via the usual WinSPOX message (step 20), address translation, and SIO_reclaim( ) (step 21), in the same order that they were issued. SIO_flush( ) should be used regardless of whether the stream is capture or playback. The Media Client 202 should track how many buffers it has outstanding to the Redirector, in order to know how many buffers to reclaim.

Shutting Down a Redirector Channel

Figure 9:
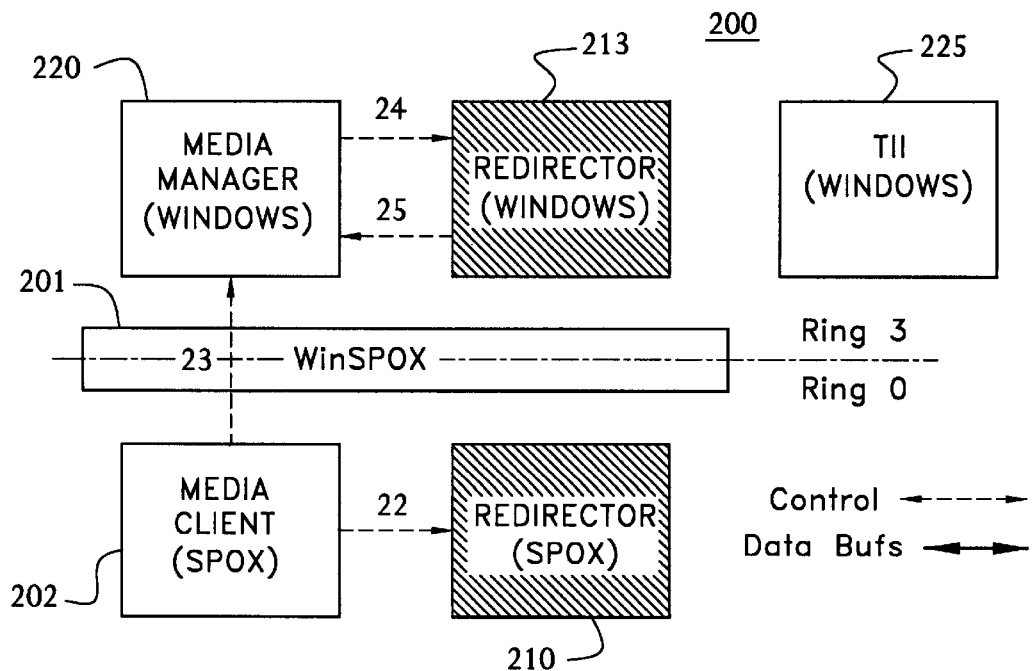
FIG. 9 illustrates the steps of shutting down a redirector channel in the computer system of FIG. 2.

Referring now to FIG. 9, there are illustrated the steps of shutting down a redirector channel in computer system 200 of FIG. 2. Once all buffers have been flushed and reclaimed by the Media Client 202, the stream may be closed by calling SIO_delete( ) (22). This will cause all LDTs which were used within the Redirector for Ring 0/3 address translation to be de-allocated, and any other stream-related internals to be de-activated.

The SIO_delete( ) may fail for one of the following reasons:

Failure to successfully de-allocate all LDT entries;

Failure to communicate internally between Stream and Redirector task;

Failure to communicate internally between Redirector task and Ring 3 Redirector 213; or Any generic reason for which SIO_delete( ) would fail; The deletion of the stream must be signaled to the Ring 3 Media Manager 213 (step 23), which in turn may call RED_delete( ) (step 24) to destroy the Redirector channel. This returns a status (step 25). The RED_delete( ) functionality includes destroying the Ring 0 Redirector task. It is therefore important that this be executed after the SIO_delete for the stream has completed. If desired, the Media Client stream may be re-opened, as long as RED_delete( ) has not been called. Thus, it should be ensured that RED_LinkIn/Out has been called again to re-establish a valid TII channel connection, or else buffers issued into the new stream will simply collect within the Ring 3 Redirector 213.

Loopback

The Redirector supports a loopback mode, in which two complementary Redirector channels are used to exchange buffer contents between two Media Client streams. Setup of the two loopback Redirector channels is performed with two calls to RED_CreateChnl( ). The first channel is created in the normal fashion, without specifying loopback. The second channel must specify loopback, however, and must also reference the first channel in the RED_CreateChnl( ) call, by including the "magic cookie" from the first RED_CreateChnl( ). Further, the second RED_CreateChnl( ) call must specify an operating mode (playback/capture) opposite to that of the first call.

All other calls from the Media Manager 220 or the Media Client 202 will respond as if the Redirector channels were operating in normal mode, with the following exceptions:

RED_LinkIn/Out will not register the internal data handler callback with TII 225;

SIO_issue( ) will not cause a buffer to be posted to TII 225. Instead, it will be made available to exchange data with the complementary loopback channel.

The data exchange occurs in Ring 3, which supports testing of all of the Media Client 202 and Ring 0 Redirector 210 functionality, in addition to testing the messaging communication between the Ring 0 Redirector 210 and the Ring 3 Redirector 213. In one embodiment, data exchange involves waiting for one buffer to be SIO_issued to each of the complementary data streams, then cross-copying the buffer contents between the two buffers in Ring 3, then returning them to Ring 0 in the normal fashion. If more than one buffer is SIO_issued on a given stream before a complementary buffer is issued on the complementary stream, the earlier buffer will be lost.

The RED_CreateChnl( ) call may fail when specifying loopback for any of the reasons as in normal operation. In addition, it may fail for one of the following reasons:

Invalid "magic cookie" for complementary loopback channel;

Specified complementary loopback channel not yet created/open;

Specified complementary loopback channel already in loopback with another channel;

Specified operating mode (playback/capture) same as complementary loopback channel.

SPOX Task Priority and .ndb files

The IA-SPOX task priority of the Redirector task should be one of the highest in the system. It should always be higher than the Media Client 202 task priorities. There are several reasons for this:

The functionality of the Redirector is that of a pipe within the system, rather than a data source, sink, or processor. Over-burdening the system with data processing should not be allowed to clog a simple pipe. In an extreme case in which the Redirector had lower priority than some Media Clients with heavy data processing appetites, the data processor function(s) would own the system until no more buffers were available to process (i.e. all buffers in the system are clogged up within the Redirector). Instead, the Redirector should be able to move a buffer to or from the Media Client 202 as soon as it is available.

The operation of the Redirector is quick and efficient, so that it will never tend to bog the system down, even if a top priority task.

The priority of the Redirector tasks under IA-SPOX is set in a file such as an ".ndb" file for the Redirector.

External Interfaces

The following three external interfaces are supported and used by the Redirector invention described herein.

Application: Ring 3 setup/teardown. Exported by a DLL such as REDIRHST.DLL.

TII: Buffer transfer to/from comm transport. Exported by TII.

Media Client: IA-SPOX SIO interface. Supported by a DLL such as PIIREDIR. DLL.

Application Interface

The Redirector supports the following calls at Ring 3. These calls establish and tear down Redirector channels, establish connections to TII 225, and supply information to enable connections to the Media Client(s).

RED_CreateChnl

Syntax:

```
int error = RED_CreateChnl(
FARPROC    tiiSendDataP,        // TII Send Data Function
FARPROC    tiiRecvDataP,        // TII Receive Data Function
FARPROC    tiiRegChanHndlrP,    // TII Register Channel Handler
                                   Function
int FAR    *lpChnlIndex,        // chnlinfo index for this channel
BOOL       playback,            // Playback/Capture
BOOL       loopback,            // Ring 3 Loopback/Normal mode
int        loopbackchnl         // Loopback Channel (if loopback
                                   mode)
);
```

Description:

Creates a new Redirector channel. This includes creating a new Ring 0 Redirector SPOX task.

Parameters:

```
FARPROC    tiiSendDataP,        // TII Send Data Function
FARPROC    tiiRecvDataP,        // TII Receive Data Function
FARPROC    tiiRegChanHndlrP,    // TII Register Channel Handler
                                   Function
int FAR    *lpChnlIndex,            // chnlinfo index for this
                                   channel
BOOL       playback,            // Playback/Capture
BOOL       loopback,            // Ring 3 Loopback/Normal mode
int        loopbackchnl         // Loopback Channel (if loopback
                                   mode)
```

Return:

```
int        error                // error (0 if okay)
```

Comments:

This call opens a new Redirector channel, including opening a new Redirector SPOX task in Ring 0.

The 3 pointers to TII functions must be obtained by the calling code, and passed to the Redirector via this call. When this call completes, it will have filled in the "magic cookie" for this channel in the variable pointed to by lpChnlIndex. This cookie must be used in subsequent calls to this channel from the Application interface. Playback must be set "TRUE" if this channel is being set up for a Media Client which renders data locally. Playback must be set "FALSE" if this channel is being set up for a Media Client that captures data. This variable is used internally to select the appropriate function pointer for sending buffers to TII 225, and is also used to confirm that the Media Client data stream is opened in the proper mode (input/output).

Loopback must be set to "TRUE" if and only if this new channel will be used in loopback mode, and another, complementary channel has already been set up using the RED_CreateChnl call in non-loopback mode. The magic cookie for the complementary channel must be supplied in this call. Once this call is complete, both channels will be set up to cross-copy, in Ring 3, the contents of data buffers issued by their respective Media Client data streams, and bounce the buffers back to Ring 0 so that the Media Client data streams may reclaim them.

RED_LinkIn
Syntax:

```
#include TII.H
   ULONG streamhandle = RED—LinkIn(int chnlIndex, HCHAN tiiRecvChanParm);
```

Description:

Registers internal Redirector callback as data handler for specified TII channel.

Returns stream handle for opening Media Client stream.

Parameters:

| int | chnlIndex, | // magic cookie for desired Redirector channel |
|---|---|---|
| HCHAN | tiiRecvChanParm | // handle for TII channel (see TII spec) |

Return:

| ULONG | streamhandle | // stream handle for opening Media Client stream |
|---|---|---|

Comments:

This call may be made only after a TII channel has been opened. This call registers an internal callback routine as the low level data handler for the specified TII channel.

This call also returns the stream handle used for opening the Media Client data stream in Ring 0 SPOX. This handle is actually a pointer to a stream name, of the form "/redirector:XXXXXXXXXXXXXXXX", in Ring 0. This value should never be interpreted by any Ring 3 entity. It should be used in an SIO_create( ) call by the Media Client.

If the call is unsuccessful, the stream handle returned will be NULL.

RED_LinkOut
Syntax:

```
#include TII.H
ULONG streamhandle = RED_LinkOut( int chnlIndex, HCHAN tiiSendChanParm);
```

Description:

Registers internal Redirector callback as data handler for specified TII channel.

Returns stream handle for opening Media Client stream.

Parameters:

| int | chnlIndex, | // magic cookie for desired Redirector channel |
|---|---|---|
| HCHAN | tiiSendChanParm | // handle for TII channel (see TII spec) |

Return:

| ULONG | streamhandle | // stream handle for opening Media Client stream |
|---|---|---|

Comments:

This call may be made only after a TII channel has been opened. This call registers an internal callback routine as the low level data handler for the specified TII channel.

This call also returns the stream handle used for opening the Media Client data stream in Ring 0 SPOX. This handle is actually a pointer to a stream name, of the form "/redirector:XXXXXXXXXXXXXXXX", in Ring 0. This value should never be interpreted by any Ring 3 entity. It should be used in an SIO_create( ) call by the Media Client.

If the call is unsuccessful, the stream handle returned will be NULL.

RED_DeleteChnl
Syntax:

| int error = RED_DeleteChnl(int chnlIndex); |
|---|

Description:

Tears down a Redirector channel, including deleting the Ring 0 SPOX Redirector task.

Parameters:

| int chnlIndex; | // "magic cookie" for this Redirector channel |
|---|---|

Return:

| int | error; | // error code (0 if successful) |
|---|---|---|

TII Interface

The Redirector uses the following TII calls. Pointers for all 3 of these calls must be supplied to the Redirector when the Application calls RED_CreateChnl( ).

RegisterChanHandler

This call registers a callback function internal to the Ring 3 Redirector 213 as the data buffer handler for a TII data channel. RegisterChanHandler is invoked internally when a RED_LinkIn or RED_LinkOut call is made for a Redirector channel which is not in loopback mode. TII calls this callback whenever TII has a buffer available for return to the Media Client 202. The callback function sends the buffer down to the Ring 0 Redirector 210, which makes it available to the Media Client 202.

SendData

A capture channel uses this call internally to post a buffer of data from the Media Client 202 to TII 225 to be transmitted to the remote peer. An SIO_issue call on a capture stream will cause a ReceiveData call to be made.

ReceiveData

A playback channel uses this call internally to post an empty buffer from the Media Client 202 to TII 225 to be filled with data received from the remote peer. An SIO_issue call on a playback stream will cause a ReceiveData call to be made.

IA-SPOX Media Client Interface

The following IA-SPOX calls are supported by the Redirector.

SIO_create( )

This call establishes a SPOX data stream between the Media Client 202 and the Redirector. The stream name used in this call must be the name obtained from the RED_LinkIn or RED_LinkOut call for the associated Redirector channel.

SIO_issue( )

This call passes a single buffer into the Redirector. The Redirector immediately translates the buffer address from Ring 0 to Ring 3, passes the buffer up to Ring 3, and returns from the SIO_issue( ) call. From that point, the Ring 3 Redirector 213 asynchronously posts the buffer to TII 225. For a capture channel, the issued buffer should be full of data. For a playback channel, the issued buffer should be empty (to be filled by TII).

SIO_reclaim( )

This call grabs a single buffer from the Redirector. The Argument associated with the buffer indicates any error flags associated with the buffer. The buffer pointer, if null, indicates that no real buffer was returned, just an indication of some internal error in the Argument field. Error flags in the Argument include:

| | |
|---|---|
| RED_BACKEDUP | indicates that Ring 3 Redirector 213 was unsuccessful in posting this buffer to TII 225 |
| RED_LOST_DATA | indicates that TII 225 raised DATA_DROPPED flag with this buffer |
| RED_TII_CONFUSED | indicates erratic TII behavior (e.g. bad transaction ID) |
| RED_FLUSHED | indicates that this buffer had been flushed from the Ring 3 buffer list |
| RED_SKIPPED | indicates that this buffer had been skipped (TII returned a buffer out of order) |
| RED_BAD_ADDR | Indicates Ring 0 Redirector 210 could not translate buffer address from Ring 3 |

For a capture channel, the reclaimed buffer should be empty. For a playback channel, the reclaimed buffer should normally be full of data to be rendered.

SIO_select( )

This call may be used as normal in IA-SPOX. It may be used within the Media Client 202 to sense back pressure (non-availability of buffers to be reclaimed from the Redirector), and may be especially useful for such purpose if a finite timeout value is used.

SIO_idle( )

Calling SIO_idle for a capture channel causes the call to block until all outstanding buffers are returned from Ring 3 TII 225 to Ring 0. This means that TII 225 must process all of the buffers which have been posted, and return them. There is no active support within the Redirector for causing this to happen. Calling SIO_idle for a playback channel causes all buffers to be flushed immediately from Ring 3 back to Ring 0. With TII, this means that the TII connection must be closed before calling SIO_idle. Otherwise, TII might try to access buffers which it thinks it owns, but which have actually been returned to Ring 0, and perhaps been de-allocated. With PII, this call may be made legitimately even with the connection still open. This is because PII never "owns" a buffer, so the Redirector can flush pending buffers from Ring 3 back to Ring 0 without concern of PII accessing them.

SIO_flush( )

This call is similar to SIO_idle, but causes all buffers to be flushed immediately from Ring 3 back to Ring 0, regardless of whether the channel is capture or playback. With TII, this call should be made only after closing the TII connection, in order to prevent TII from accessing the flushed buffers. With PII, this call may be made legitimately even with the connection still open.

SIO_delete( )

This call closes the SPOX Media Client data stream. It also causes all LDTs which were allocated by the Redirector (for Ring 0 to Ring 3 address translation) to be de-allocated.

Internal Specifications

Internally, the Redirector is divided into two separate DLLs, as described above, and is built, in one embodiment, from three separate code modules. One DLL resides in Ring 3, and one resides in Ring 0. The Ring 3 Redirector sits above WinSPOX 201, and supports external interfaces to the Application (a control interface such as a video conferencing application) and to TII 225 (a data buffer transfer interface). It also launches and destroys instances of the Ring 0 Redirector 210 via WinSPOX 201 when the Application tells it to.

The Ring 0 Redirector 210 sits below WinSPOX 201, and supports the external interface to the Media Client 202 (another data buffer transfer interface). Once the Ring 3 Redirector 213 has launched an instance of the Ring 0 Redirector 210, the two DLLs communicate to each other and transfer buffers via WinSPOX messages, as will be understood by those skilled in the art.

Theories of Operation

Figure 10:
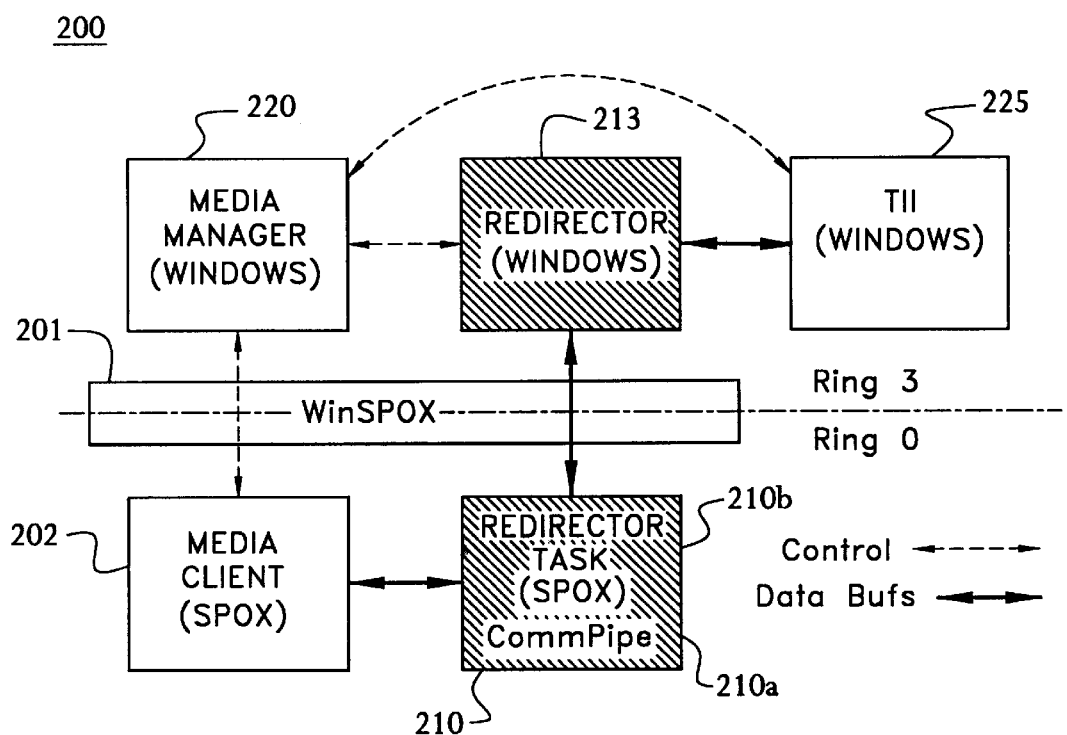
FIG. 10 shows the computer system of FIG. 2 illustrating further details of the Ring 0 redirector module of the computer system.

Referring now to FIG. 10, there is shown the computer system 200 of FIG. 2 with further details of the Ring 0 redirector module. As shown, the Ring 3 Redirector 213 comprises one module, and the Ring 0 Redirector 210 comprises the Ring 3 Redirector task 210b and the Comm Pipe 210a. The following sections describe the way the 3 code modules operate internally.

Ring 3 Redirector

Ring 3 Redirector 213 is responsible for the following operations:

Opening new Redirector channels;

Registering itself as a Data Handler for the comm transport (i.e, via TII 225);

Providing a Stream Handle for a Ring 0 SPOX data stream;

Receiving buffers from Ring 0 Redirector 210'

Posting buffers to the comm transport;

Receiving buffers from the comm transport;

Returning buffers to the Ring 0 Redirector 210;

Performing Loopback if specified; and

Closing Redirector channels.

Opening New Channels

When the Application calls RED_CreateChnl( ), the Ring 3 Redirector 213 initializes some operating parameters in Ring 3, and also calls WinSPOX 201 to open a new instance of the Redirector SPOX Task. Internal to the Ring 3 Redirector 213, an array of NUMCHAN (for example, 10) chnlinfo structures support the internal operating parameters. RED_CreateChnl scans the array for the first unused chnlinfo structure, initializes it, and returns the index of the structure (the "magic cookie") to the Application. This index value must be used by the Application in subsequent calls to the Redirector. In alternative embodiments, each channel may be treated as an object, and a new object is thus created each time RED_CreateChnl is called. Instead of being limited to NUMCHAN channels, this would make the number of channels open-ended.

The Ring 3 Redirector 213 DLL contains a global gUniqueID variable, which is post-incremented each time a new instance of the Redirector SPOX task is created. This value is sent as an opening parameter to the Redirector task, and is used by the Redirector task to generate a unique name for the Redirector device. In alternative embodiments, the execution of the RED_CreateChnl( ) function may wait for the new Redirector task to return a valid Stream Name.

If loopback is specified in the RED_CreateChnl( ) call, the Ring 3 Redirector 213 performs a few extra checks on the specified complementary loopback channel (which must have been set up in a previous RED_CreateChnl call without specifying loopback), then sets both channels (current and complementary) into loopback mode.

Registering with Transport

In response to the RED_LinkIn or RED_LinkOut call, the Redirector registers an internal callback routine as the data handler for the communication transport interface (such as TII 225). In one embodiment, there is only one callback, common to all channels, whether capture or playback. In alternative embodiments, if each channel is treated as an object, then the callback for each channel would be unique. This has an advantage in the case of TII returning a NULL transaction ID in the DATA_DROPPED case, since the channel would be identified by the callback, not by the transaction ID (discussed below). It may also simplify the requirements for the transaction ID contents, since currently the Redirector channel index is included in the transaction ID, but would be unnecessary if each channel had a unique callback.

Providing the Stream Handle

The Stream Handle is generated by the Redirector Task in its Create Phase (discussed below). It is sent automatically to the Ring 3 Redirector 213 in a message as soon as the Redirector Task enters its Execute phase. The Ring 3 Redirector 213 stores this value (which is a Ring 0 32-bit pointer to a character array, in one embodiment) in its chnlinfo structure. If no error occurs during the execution of RED_LinkIn or RED_LinkOut, these functions return the Stream Handle to the Application. If an error occurs, or the Stream Handle has not yet been received from the Redirector Task, these functions return NULL.

Receiving Buffers from Ring 0 Redirector, Posting to TII

Messages are handled in a standard way for the WinSPOX interface. RED_spoxCallback checks the event type to see if WinSPOX is sending a message or other event, or confirming RUN or DESTROY status of the Redirector task. If a message is received, the callback calls HandleEvent( ) to parse the message and handle it appropriately. The RED_BUFTOHOST message includes a Ring 3 address and a byte count for a new buffer from Ring 0. The BufToTii( ) function builds a TII transaction ID from the Redirector channel index, and an index into an array of transaction records for this channel.

The transaction record retains the address and a status word associated with each buffer received from Ring 0. This array of transaction records maintains the order of the buffers as received from Ring 0. Buffers must be returned in the same order as received, in order to satisfy the IA-SPOX SIO issue/reclaim protocol requirements for buffer order. After building the transaction record, BufToTii( ) posts the buffer to TII 225, using either the tiiSendDataP or the tiiRecvDataP function pointer (received in the RED_CreateChnl call), depending on whether this is a capture or a playback channel. If the post is unsuccessful, the transaction record is marked with the RED_TIIBACKEDUP flag, and the buffer is sent immediately back down to Ring 0.

Receiving Buffers from TII, returning to Ring 0

The RED_tiiCallback function handles buffers coming back from TII. RED_tiiCallback parses the transaction ID received from TII to determine the Redirector channel and transaction record associated with this buffer. It also determines whether the transaction ID is 0, which is the value sent by TII 225 in the case of dropped data with no buffer to return.

If the transaction ID is valid, RED_tiiCallback checks the transaction records to determine if any buffers were skipped by TII (i.e. there is a buffer ahead of this one waiting to be returned to Ring 0). This should not normally be the case, but if one is found, it is marked with RED_SKIPPED flag and returned to Ring 0, to maintain buffer order. After any skipped buffers are returned, then the current buffer is returned via a BUFTOSPOX message, including the Ring 3 buffer pointer and the byte count returned from TII 225. If TII indicated DROPPED DATA, and had a non-zero transaction ID, then the buffer is marked with RED_DROPPED_DATA. The status flags appear ultimately in the Argument when the Media Client receives the buffer via an SIO_reclaim( ).

Performing Loopback

In loopback mode, the Ring 3 Redirector 213 does not send buffers to TII 225. Rather, it waits for a pair of buffers to become available, one each on a pair of loopback channels. Once the pair is available, it cross-copies the contents of the buffers, then sends the buffers back down to Ring 0.

Closing Redirector Channels

RED_DeleteChnl( ) causes the shutdown of the Redirector SPOX task, and the resetting of all pertinent data in the chnlinfo structure.

Ring 0 Redirector Task

The Redirector Task supports the communication between the Ring 3 Redirector 213 and the internal Ring 0 SPOX stream supported by the CommPipe. For each Redirector channel, the Ring 3 Redirector 213 opens a separate instance of the Ring 0 Redirector 210 task. This method is convenient for supporting an open-ended number of channels, since WinSPOX 201 has good support for multiple instances of tasks. The Ring 0 Redirector task is responsible for the following:

Initializing a Redirector task instance, including creating a new Shared Pipe, in response to Ring 3 Redirector response to RED_CreateChnl( ) from Application.

Setting up an internal stream to the CommPipe, in response to SIO_create( ) from Media Client.

Receiving buffers from the CommPipe.

Translating buffer addresses from Ring 0 to Ring 3.

Forwarding buffers to Ring 3 Redirector.

Receiving buffers from the Ring 3 Redirector.

Translating buffer addresses from Ring 3 to Ring 0.

Forwarding buffers to CommPipe.

Forwarding and responding to Idle and Flush messages from CommPipe.

Tearing down an internal stream to the CommPipe, in response to SIO_delete( ) from Media Client.

Cleaning up a Redirector task instance, in response to Ring 3 Redirector response to RED_DeleteChnl( ) from Application.

Initialization

Task and Pipe initialization occur primarily in the Create phase of the Redirector task. This includes the following:

Initializing a State structure for the task;

Creating a unique device name for this instance of the Ring 0 Redirector;

Creating a Shared Pipe;

Creating a mailbox and semaphores for communication between CommPipe and Redirector task; and Setting up an SIO_select structure for detecting external stimuli.

The state structure keeps track of all operating parameters and resources for the Redirector task instance, including handles for streams, mailboxes, and semaphores, playback/capture mode, device name, etc. The device name is of the form "/redirector:XXXXXXXXXXXXXXXX", in which the X's are an ASCII representation of a unique number supplied by the Ring 3 Redirector 213. This name is used by the Media Client 202 to open the stream between the Media Client 202 and the CommPipe side of the Redirector. One CommPipe is created for each Redirector Task. This is done by calling the mkSPipe function in the COMMPIPE.C module. The State structure keeps a pointer to the resultant Shared Pipe structure, and the Shared Pipe structure keeps a pointer to the State structure. This allows the CommPipe to send messages to a Redirector task mailbox, and also allows the CommPipe to pend on Redirector task semaphores. An SIO_select structure is set up by including handles for:

Host Mailbox—for receiving messages from the Ring 3 Redirector;

CommPipe Mailbox—for receiving messages from the associated CommPipe; and

Internal Stream—for receiving buffers from the CommPipe.

Once in the Execute phase of the task, the Redirector enters a continuous loop of waiting for external stimuli via an SIO_select call, and then responding to the stimuli. Before entering the loop, however, the Redirector sends an "automatic" Stream Name message to the Ring 3 Redirector 213, including a 32-bit pointer to the unique Device Name string. This allows the Ring 3 Redirector 213 to store the pointer (also called the Stream Handle) for return to the Application after a RED_LinkIn/Out call.

Setting up the Internal Data Stream

Upon receiving the RED_OPEN message from the CommPipe, the Redirector task performs an SIO_create( ) to the Redirector side of the CommPipe. This is always in indirect response to an SIO_create( ) from the Media Client 202, which opens a stream to the Media Client 202 side of the CommPipe. If the Redirector SIO_create( ) is successful, the Redirector tasks sets the state->open variable to TRUE. If the Redirector SIO_create( ) is unsuccessful, then the Redirector sets the state->open variable to FALSE. The Redirector task then performs a SEM_post( ) to the "Open" semaphore. This allows the CommPipe to return from the original SIO_create( ) from the Media Client 202 with appropriate status.

Receiving Buffers from the CommPipe and Translating to Ring 3

Upon detecting an available buffer from the Redirector side of the CommPipe, the Redirector task performs an SIO_reclaim( ) to fetch the buffer from the stream. This is always in indirect response to an SIO_issue( ) from the Media Client 202. The Redirector then translates the base address of the buffer into Ring 3. For each new buffer encountered, the Redirector allocates a new Local Descriptor Table entry for the System Virtual Machine (SysVM).

The Redirector keeps a record of each LDT entry in one of two queues. The "used" queue stores entries for buffers forwarded to Ring 3, but not yet returned. The "free" queue stores entries for those buffers which have been returned from Ring 3. When a buffer is received from the CommPipe, the Redirector looks in the "free" queue to see if an LDT has already been allocated for this buffer. If so, it simply uses the same LDT, rather than allocating a new one (LDTs. as will be understood, are a limited resource). If a channel has been operating long enough to have processed all of the buffers allocated by the Media Client 202, and buffer order is preserved (which is a requirement of the SIO_issue/reclaim protocol), the entry at the head of the "free" queue should be a match for the buffer. If a match is not found at the head, however, the Redirector will sequence through the entire "free" queue looking for a match before deciding to allocate a new LDT entry.

Forwarding Buffers to Ring 3 Redirector

Once an appropriate LDT entry has been found or allocated for the buffer, the Redirector builds a WinSPOX message including the following data:

RED_BUFTOHOST message;

Ring 3 Base Address;

Number of Bytes in Buffer;

Argument (currently unused);

The Ring 3 Base Address is the value of the LDT Selector, shifted left 16 bits, and right-filled with 0's. This constitutes a valid Ring 3 Far Pointer address.

The number of bytes in the buffer is simply passed along from the results of the SIO_reclaim( ) call, and is the number of bytes originally set by the Media Client 202 in its SIO_issue call for this buffer. In one embodiment, the Argument is not used by the Ring 3 Redirector, but is the value of the Argument originally set by the Media Client 202 for the buffer.

Receiving Buffers from the Ring 3 Redirector and Translating to Ring 0

Upon receiving the RED_BUFTOSPOX message from the Host, the Redirector task examines the contents of the message, which includes a Ring 3 address, byte count, and Argument, similar to the format for sending buffers up to Ring 3. This action may be in indirect response to an callback from TII, or from a Flush action. Normally, the address should be an address sent to the Ring 3 Redirector by this instance of the Ring 0 Redirector 210. Further, if buffer order is preserved, the LDT entry for this buffer should be at the head of the "used" LDT queue. The Redirector looks there first, comparing the Ring 3 address of the queue entry with that of the buffer just received. If a match is not found, it searches the entire "used" queue.

Once a match is found in the queue, the Redirector simply uses the Ring 0 address recorded in the queue entry and sends the buffer back through the CommPipe (discussed below). If a match is not found, including the case of the Ring 3 Redirector 213 sending a NULL buffer down (an indication of TII exception or other error condition), the Ring 0 Redirector 210 will forward a NULL buffer address, and will set the RED_BAD_ADDR bit in the Argument field (Oring with any bits set by the Ring 3 Redirector 213).

Forwarding Buffers to CommPipe

Once the translation is complete, the Redirector task performs an SIO_issue to the CommPipe stream. This may include a NULL value for the buffer address if an error was encountered. It also includes error flags in the Argument field which may have been set by the Ring 3 Redirector or the Ring 0 Redirector. If all is normal, the Argument value is 0.

Idle and Flush

Upon receiving the RED_IDLE or the RED_FLUSH message from the CommPipe, the Redirector task forwards a RED_STREAMIDLE or RED_STREAMFLUSH message to the Ring 3 Redirector 213, and sets the "flushing" flag in the state structure. This may be in indirect response to an SIO_idle( ), SIO_flush( ), or an SIO_delete( ) from the Media Client. The Ring 3 Redirector 213 responds actively to the RED_STREAMFLUSH message, and immediately sends all outstanding buffers back down to Ring 0. A RED_STREAMIDLE message, however, causes no pro-active response from the Ring 3 Redirector 213.

As the Ring 0 Redirector 210 processes these buffers, and the "flush" flag is set, it keeps checking the state->tohost and state->topipe values. If these values are equal, it means that all buffers outstanding have been returned to Ring 0. At this point, the Redirector sets the "flush" semaphore, which enables the CommPipe to return from the DRE_idle call, which allows SIO to return from the Media Client SIO call.

Tearing Down the Internal Stream

Upon receiving the RED_CLOSE message from the CommPipe, the Redirector task performs an SIO_delete( ) to the Redirector side of the CommPipe. This is always in indirect response to an SIO_delete( ) from the Media Client. In addition, the Redirector task de-allocates all LDT entries in both the "used" and the "free" LDT queues. Under normal conditions, the "used" queue should be empty, since all buffers should have been flushed from Ring 3. Currently, there are internal checks for the success of de-allocating the LDTs, resulting in a SYS_printf, but a failure is not indicated to the Media Client nor to the Ring 3 Redirector 213.

If the Redirector SIO_delete( ) is successful, the Redirector tasks sets the state->closeokay variable to TRUE. If the Redirector SIO_create( ) is unsuccessful, then the Redirector sets the state->closeokay variable to FALSE. The Redirector task then performs a SEM_post( ) to the "Close" semaphore. This allows the CommPipe to return from the original SIO_delete( ) from the Media Client 202 with appropriate status.

Cleaning Up the Task Instance

Upon receiving the TD_EXIT message from the Host, the Redirector task exits the Execute phase and enters the Delete phase. This is always in indirect response to an RED_DeleteChnl( ) from the Application. In the Delete phase, the Shared Pipe is destroyed, along with all mailboxes, semaphores, etc., allocated in the Create phase. Finally, the state structure is de-allocated.

Ring 0 CommPipe

For each Redirector channel, a CommPipe provides the external stream interface to the Media Client 202, which communicates with the CommPipe via SPOX SIO calls. The ConmmPipe also provides an internal stream interface to the Ring 0 Redirector task. This arrangement provides a convenient method for transferring buffers between the Media Client 202 and the Redirector tasks. The CommPipe supports all required SPOX driver functionality to make the Redirector appear as a terminating device to the Media Client 202 stream.

Tight Coupling of CommPipe with Redirector Task

The CommPipe is built from the same code as the standard SPOX Pipe (DPI), but modified to couple tightly with the Redirector Task. If buffer transfer were the only requirement of the Media Client/Redirector stream, a standard SPOX Pipe might be suitable. However, the CommPipe must be set up to recognize a unique stream name, which is set up by the Redirector task, and the CommPipe must also pass special requests along to the Redirector task from the Media Client 202, such as flush requests.

These requirements mandate cross-knowledge between the CommPipe and the Redirector task, as well as a method for waking up the Redirector task when special requests are made by the Media Client. Therefore, the CommPipe and the Redirector task are bound together within the same DLL. The cross-knowledge is supported by cross-referencing the CommPipe's Shared Pipe structure with the Redirector Task's State structure. The Create phase of the Redirector builds both of the structures (the Shared Pipe is built by a call to mkSpipeo in the COMMPIPE.C module). Each structure has an element which points to its complement.

Bridging Media Client and Redirector Threads

The CommPipe serves as the bridge between the Media Client 202 and the Redirector tasks, and may execute many operations on the thread of either the Media Client 202 or the Redirector Task (e.g. DRE_open, DRE_ioFunc). Some operations (e.g. DRE_idle) are called only from the Media Client thread. The Redirector task always executes on its own thread. The separation of the Media Client 202 and the Redirector threads is necessary in order for the Ring 3 Redirector 213 to communicate with the Redirector via a unique, known mailbox under WinSPOX.

The Redirector thread may be woken up by the Media Client thread by one of two methods:

Messages from CommPipe via Pipe mailbox; or

Buffer availability on internal data stream.

The message from the Pipe is via a mailbox set up in the Create phase (yet another reason for cross-knowledge). Media Client calls to SIO_create( ), SIO_idle( ), SIO_flush( ), and SIO_delete( ) are handled via such messages. In these cases, the CommPipe sends a message to the Redirector task, and then pends on a response semaphore. This blocks the Media Client thread. The Redirector task then responds to the message, completes the requested process, and sets the response semaphore. This allows the CommPipe to proceed on the Media Client thread, and return from the driver call (e.g. DRE_open, DRE_idle) so SIO can return from the Media Client's SIO call.

Media Client calls to SIO_issue( ) are not supported by the internal mailbox, but rather by the normal CommPipe stream mechanism, which notifies the Redirector task that a buffer is ready via the SIO_select mechanism. Media Client calls to SIO_reclaim are supported internal to the CommPipe module, which stacks up buffers which are SIO_issued from the Redirector task.

As will be understood, the present invention can be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. In a computer system having a processor for running an operating system having processing ring levels, wherein a ring level is a priority level at which the processor operates when running programs using the operating system and ring 0 has a highest priority and ring 3 has a lower priority than the highest priority, a method for binding a data sink to a data source to transfer data chunks from an unbound ring 0 data source to a ring 3 data sink, the method comprising the steps of:

(a) transmitting, with a ring 3 media manager module, a binding channel create call to a ring 3 redirector dynamic link library (DLL) module;

(b) creating, with the ring 3 redirector module in response to the binding channel create call, an instance of a ring 0 redirector DLL module, the ring 0 redirector module comprising a ring 0 task module and a ring 0 commpipe module bound together within the ring 0 redirector module, and assigning, with the ring 3 redirector module, a unique instance number to the ring 0 redirector module;

(c) generating, with the ring 0 task module, a unique instance name incorporating the unique instance number;

(d) creating a new binding channel and attaching the binding channel to the ring 3 data sink via a ring 3 transport interface module that provides the ring 3 data sink;

(e) obtaining, with the ring 3 redirector module, a handle to the unique instance name;

(f) passing the handle to a ring 0 media client module that provides the ring 0 data source, wherein the ring 0 media client module is designed to deliver data chunks to ring 0 data sinks; and (g) using, with the ring 0 media client module, the handle to bind the ring 0 data source to the binding channel and to the ring 3 data sink via the ring 0 commpipe module, wherein the ring 0 commpipe module is for providing an internal stream to the ring 0 task module and the ring 0 task module is for translating data chunk addresses from ring 0 to ring 3 and from ring 3 to ring 0, whereby the ring 3 data sink appears to the ring 0 media client module to be a ring 0 data sink and the ring 0 media client module is not required to have knowledge of ring 3 interfaces in order to establish the binding connections.

2. The method of claim 1, wherein ring 3 media manager module specifies binding connections that define the binding of the ring 0 data source to the ring 3 data sink via the binding channel.

3. The method of claim 1, wherein each data chunk is transmitted over the binding channel by:

(1) translating, with the ring 0 task module, the ring 0 address of a data chunk received from the ring 0 media client module via the ring 0 commpipe module into the ring 3 address space for compatibility with the ring 3 transport interface module;

(2) advising the ring 3 transport interface module of the availability of the data chunk; and (3) accepting, with the ring 3 transport interface module, the data chunk from the ring 0 data source.

4. The method of claim 3, wherein step (1) further comprises the steps of:

determining whether the data chunk is new by determining whether the data chunk has been previously encountered by the ring 0 redirector task module;

if the data chunk is new, then allocating a new local descriptor table (LDT) entry and locally recording the existence of the LDT entry in the order allocated;

locally recording the ring 3 and ring 0 addresses associated with the LDT entry; and if the data chunk is old, then extracting the ring 3 address associated with the LDT entry.

5. The method of claim 1, wherein the ring 0 data source is a captured data stream and the second ring level data sink is a comm channel.

6. The method of claim 1, wherein the data chunks are data buffers.

7. The method of claim 1, wherein the binding channel is one of an audio capture channel and a video capture channel.

8. A storage medium having stored thereon a plurality of instructions for binding a data sink to a data source to transfer data chunks from an unbound ring 0 data source to a ring 3 data sink of a computer system having a processor for running an operating system having processing ring levels, wherein a ring level is a priority level at which the processor operates when running programs using the operating system and ring 0 has a highest priority and ring 3 has a lower priority than the highest priority, wherein the plurality of instructions, when executed by the processor, cause the processor to perform the steps of:

(a) transmitting, with a ring 3 media manager module, a binding channel create call to a ring 3 redirector dynamic link library (DLL) module;

(b) creating, with the ring 3 redirector module in response to the binding channel create call, an instance of a ring 0 redirector DLL module, the ring 0 redirector module comprising a ring 0 task module and a ring 0 commpipe module bound together within the ring 0 redirector module, and assigning, with the ring 3 redirector module, a unique instance number to the ring 0 redirector module;

(c) generating, with the ring 0 task module, a unique instance name incorporating the unique instance number;

(d) creating a new binding channel and attaching the binding channel to the ring 3 data sink via a ring 3 transport interface module that provides the ring 3 data sink;

(e) obtaining, with the ring 3 redirector module, a handle to the unique instance name;

(f) passing the handle to a ring 0 media client module that provides the ring 0 data source, wherein the ring 0 media client module is designed to deliver data chunks to ring 0 data sinks; and (g) using, with the ring 0 media client module, the handle to bind the ring 0 data source to the binding channel and to the ring 3 data sink via the ring 0 commpipe module, wherein the ring 0 commpipe module is for providing an internal stream to the ring 0 task module and the ring 0 task module is for translating data chunk addresses from ring 0 to ring 3 and from ring 3 to ring 0, whereby the ring 3 data sink appears to the ring 0 media client module to be a ring 0 data sink and the ring 0 media client module is not required to have knowledge of ring 3 interfaces in order to establish the binding connections.

9. The storage medium of claim 8, wherein ring 3 media manager module specifies binding connections that define the binding of the ring 0 data source to the ring 3 data sink via the binding channel.

10. The storage medium of claim 8, wherein each data chunk is transmitted over the binding channel by:
   (1) translating, with the ring 0 task module, the ring 0 address of a data chunk received from the ring 0 media client module via the ring 0 commpipe module into the ring 3 address space for compatibility with the ring 3 transport interface module;
   (2) advising the ring 3 transport interface module of the availability of the data chunk; and
   (3) accepting, with the ring 3 transport interface module, the data chunk from the ring 0 data source.

11. The storage medium of claim 10, wherein step (1) further comprises the steps of:
   determining whether the data chunk is new by determining whether the data chunk has been previously encountered by the ring 0 redirector task module;
   if the data chunk is new, then allocating a new local descriptor table (LDT) entry and locally recording the existence of the LDT entry in the order allocated;
   locally recording the ring 3 and ring 0 addresses associated with the LDT entry; and
   if the data chunk is old, then extracting the ring 3 address associated with the LDT entry.

12. The storage medium of claim 8, wherein the ring 0 data source is a captured data stream and the second ring level data sink is a comm channel.

13. The storage medium of claim 8, wherein the data chunks are data buffers.

14. The storage medium of claim 8, wherein the binding channel is one of an audio capture channel and a video capture channel.

15. A computer system for binding a data sink to a data source to transfer data chunks from an unbound ring 0 data source to a ring 3 data sink across processing ring levels of an operating system of the computer system, wherein a ring level is a priority level at which the processor operates when running programs using the operating system and ring 0 has a highest priority and ring 3 has a lower priority than the highest priority, the computer system comprising:
   (a) a processor for running the operating system;
   (b) a ring 3 media manager module for transmitting a binding channel create call;
   (c) a ring 3 redirector dynamic link library (DLL) module for creating, in response to the binding channel create call, an instance of a ring 0 redirector DLL module, the ring 0 redirector module comprising a ring 0 task module and a ring 0 commpipe module bound together within the ring 0 redirector module, and for assigning a unique instance number to the ring 0 redirector module, wherein the ring 0 task module comprises means for generating a unique instance name incorporating the unique instance number;
   (d) means for creating a new binding channel and attaching the binding channel to the ring 3 data sink via a ring 3 transport interface module that provides the ring 3 data sink, wherein the ring 3 redirector module comprises means for obtaining a handle to the unique instance name; and
   (e) means for passing the handle to a ring 0 media client module that provides the ring 0 data source, wherein the ring 0 media client module is designed to deliver data chunks to ring 0 data sinks, wherein the ring 0 media client module comprises means for using the handle to bind the ring 0 data source to the binding channel and to the ring 3 data sink via the ring 0 commpipe module, wherein the ring 0 commpipe module is for providing an internal stream to the ring 0 task module and the ring 0 task module is for translating data chunk addresses from ring 0 to ring 3 and from ring 3 to ring 0, whereby the ring 3 data sink appears to the ring 0 media client module to be a ring 0 data sink and the ring 0 media client module is not required to have knowledge of ring 3 interfaces in order to establish the binding connections.

16. The computer system of claim 15, wherein ring 3 media manager module comprises means for specifying binding connections that define the binding of the ring 0 data source to the ring 3 data sink via the binding channel.

17. The computer system of claim 15, wherein each data chunk is transmitted over the binding channel by:
   (1) translating, with the ring 0 task module, the ring 0 address of a data chunk received from the ring 0 media client module via the ring 0 commpipe module into the ring 3 address space for compatibility with the ring 3 transport interface module;
   (2) advising the ring 3 transport interface module of the availability of the data chunk; and
   (3) accepting, with the ring 3 transport interface module, the data chunk from the ring 0 data source.

18. The computer system of claim 17, wherein said translating further comprises:
   determining whether the data chunk is new by determining whether the data chunk has been previously encountered by the ring 0 redirector task module;
   if the data chunk is new, then allocating a new local descriptor table (LDT) entry and locally recording the existence of the LDT entry in the order allocated;
   locally recording the ring 3 and ring 0 addresses associated with the LDT entry; and
   if the data chunk is old, then extracting the ring 3 address associated with the LDT entry.

19. The computer system of claim 15, wherein the ring 0 data source is a captured data stream and the second ring level data sink is a comm channel.

20. The computer system of claim 15, wherein the binding channel is one of an audio capture channel and a video capture channel.

* * * * *